United States Patent
Ikeda

(10) Patent No.: US 9,019,407 B2
(45) Date of Patent: Apr. 28, 2015

(54) IMAGE PROCESSING APPARATUS AND IMAGE PROCESSING METHOD

(71) Applicant: Canon Kabushiki Kaisha, Tokyo (JP)

(72) Inventor: Takeshi Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/107,307

(22) Filed: Dec. 16, 2013

(65) Prior Publication Data

US 2014/0168464 A1  Jun. 19, 2014

(30) Foreign Application Priority Data

Dec. 19, 2012 (JP) ................................. 2012-277441

(51) Int. Cl.
*H04N 5/202* (2006.01)
*H04N 9/69* (2006.01)

(52) U.S. Cl.
CPC ....................................... *H04N 9/69* (2013.01)

(58) Field of Classification Search
CPC ........................................................ H04N 9/69
USPC .......................... 348/254, 255, 256, 671, 674
See application file for complete search history.

(56) References Cited

U.S. PATENT DOCUMENTS

| 8,121,404 B2* | 2/2012 | Xiao et al. ..................... 382/167 |
| 2008/0094493 A1* | 4/2008 | Igarashi ........................ 348/254 |
| 2013/0293748 A1* | 11/2013 | Fukutomi ...................... 348/254 |

FOREIGN PATENT DOCUMENTS

JP  10-234052 A  9/1998

* cited by examiner

*Primary Examiner* — Tuan Ho
(74) *Attorney, Agent, or Firm* — Carter, DeLuca, Farrell & Schmidt, LLP

(57) ABSTRACT

An image processing apparatus comprises a first calculation unit which calculates information regarding a pixel whose pixel level is equal to or greater than a first threshold in an input image, and calculates a ratio of pixels whose signal levels are equal to or greater than a second threshold in pixel data of a detected person; a second calculation unit which calculates a control amount for a tone control based on information regarding the pixel whose pixel level is equal to or greater than the first threshold; a third calculation unit which calculates a correction amount for correcting the control amount in accordance with the ratio of pixels whose signal levels are equal to or greater than the second threshold; and a control unit which determines an input-output characteristic of an image, based on the control amount and correction amount.

8 Claims, 6 Drawing Sheets

FIG. 2A
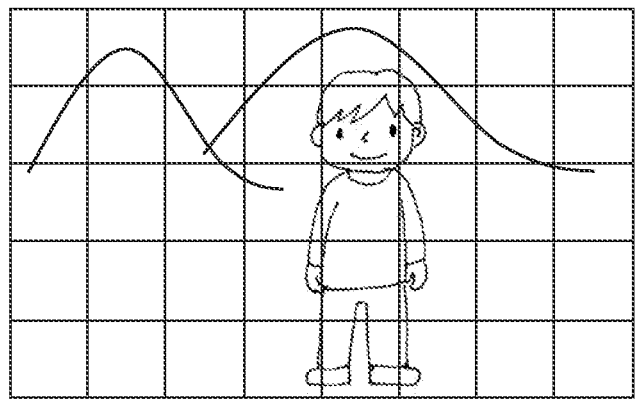
FIG. 2B
FIG. 2C
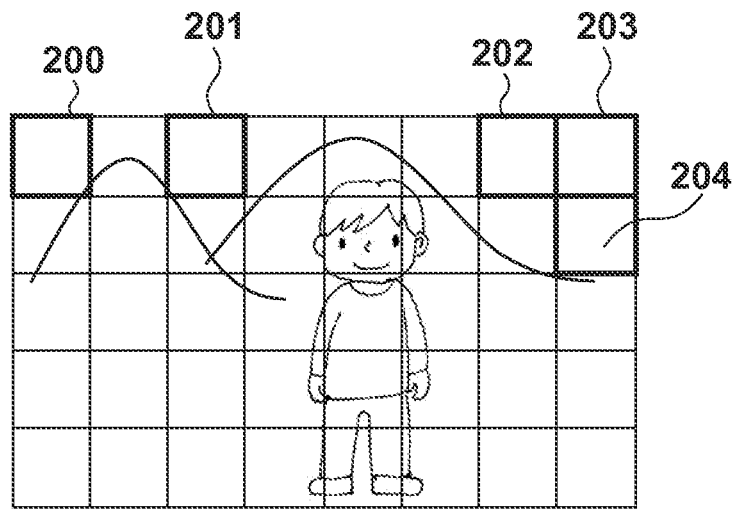

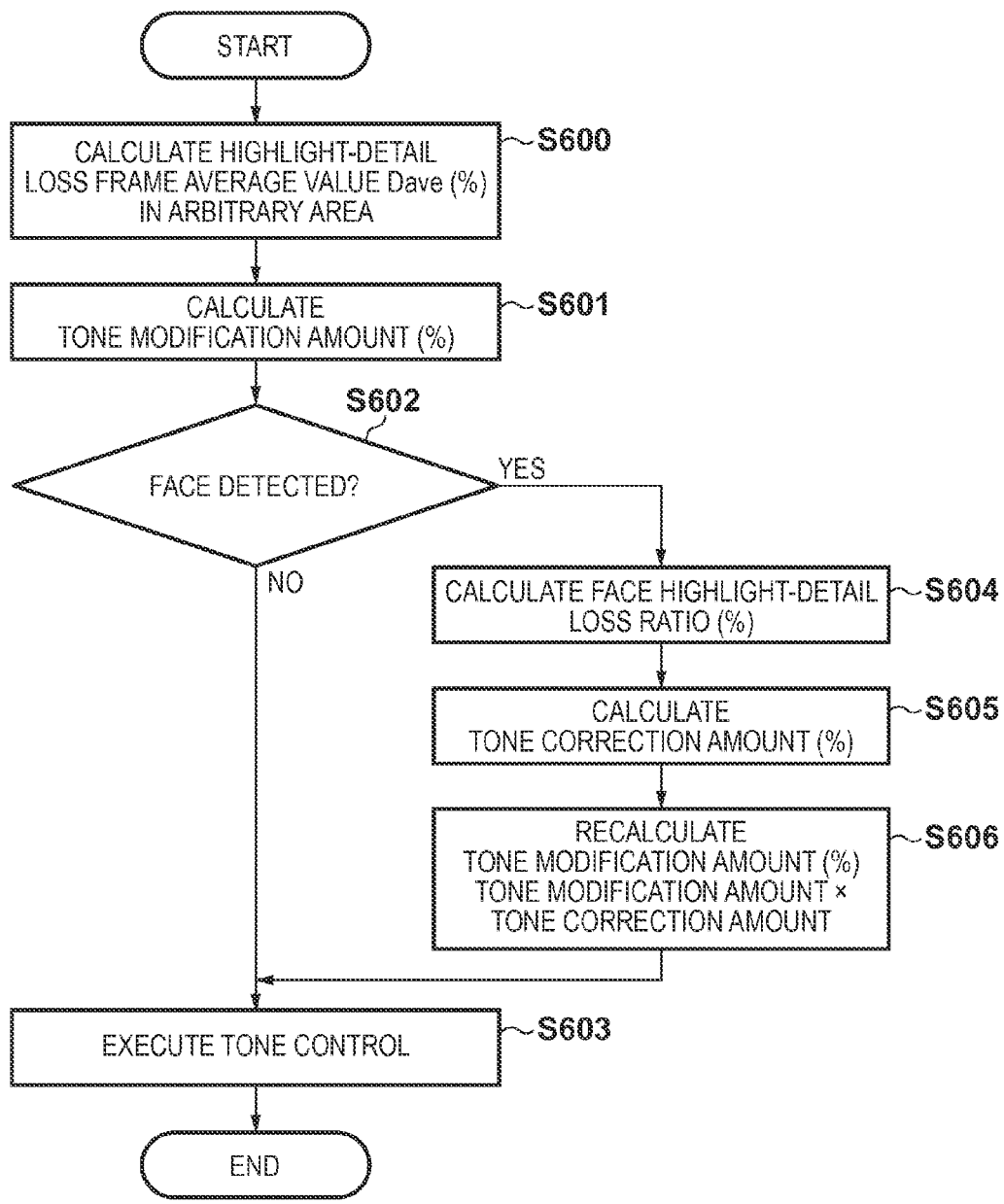

IMAGE PROCESSING APPARATUS AND IMAGE PROCESSING METHOD

BACKGROUND OF THE INVENTION

1. Field of the Invention

The present invention relates to an image processing technique for performing tone correction for an image.

2. Description of the Related Art

Regarding a gamma characteristic, which indicates an input-output characteristic of an image, as the gamma slope increases, the expressiveness of the tone of an output image with respect to an input image increases. The gamma characteristic functions as inverse gamma of an input-output characteristic of a television, and is determined depending on how the wide dynamic range of the natural world is to be compressed and brought into the dynamic range of a camera.

The normal gamma characteristic is set such that its slope in a lower-luminance portion of an image is steeper and its slope in a higher-luminance portion is less steep. For this reason, the higher-luminance portion is disadvantageous in terms of the expressiveness, compared with the lower-luminance portion. With a camera having such a gamma characteristic, if a high-luminance object exists in a image capturing screen and a user does not want to change the brightness of the entire image capturing screen, in general, the slope of the gamma in the high-luminance portion is increased. Thus, it is possible to darken only the high-luminance object and improve the expressiveness of the tone. However, if the tone in the high-luminance portion is adjusted in the case where the high-luminance object is a person's skin, color curving is noticeable.

Even if color curving occurs and some colors look different from those of the actual object in the case where the colors are not memory colors such as the colors of the sky, greens, and the skin, it would hardly look unnatural, and even when it looked unnatural, this unnaturalness would be tolerable in many cases. However, in the case of the memory colors, since people are highly sensitive to the color of a person's skin, it will look unnatural if there is even a small difference from the colors of the actual object or the colors in their memory. In particular, this results in a feeling that the person's skin color looks unnatural, and gives a strong impression that the camera has bad image quality.

As a technique related to the aforementioned color curving, for example, Japanese Patent Laid-Open No. 10-234052 recites that when any color of R, G, and B starts to be saturated, the output of the other colors is clipped at that point in time.

However, in Japanese Patent Laid-Open No. 10-234052 mentioned above, even if color curving is suppressed, the colors other than the saturated color are clipped at the point in time when any color of R, G, and B is saturated, and accordingly, the tone of the pixels which are equal to or greater than the clip level cannot be expressed, resulting in an unnatural image with poor plasticity. Further, there is also a method of deleting a color at the point in time when this color, which is any color of R, G, and B, is saturated in order to prevent the color from remaining and thus avoid the poor plasticity, but this method also results in an unnatural image since the color suddenly disappears.

SUMMARY OF THE INVENTION

The present invention has been made in consideration of the aforementioned problems, and its object is to improve the overall image quality of an entire image capturing screen by controlling the tone in a high-luminance portion.

In order to solve the aforementioned problems, the present invention provides an image processing apparatus comprising: an input unit configured to input an image; an object detection unit configured to detect a person in an input image; a first calculation unit configured to calculate information regarding a pixel whose pixel level is equal to or greater than a first threshold in the input image, and calculate a ratio of pixels whose signal levels are equal to or greater than a second threshold in pixel data of the person detected by the object detection unit; a second calculation unit configured to calculate a control amount for performing tone control based on information regarding the pixel whose pixel level is equal to or greater than the first threshold that is calculated by the first calculation unit; a third calculation unit configured to calculate a correction amount for correcting the control amount in accordance with the ratio of pixels whose signal levels are equal to or greater than the second threshold that is calculated by the first calculation unit; and a control unit configured to determine an input-output characteristic of an image, based on the control amount calculated by the second calculation unit and the correction amount calculated by the third calculation unit, wherein the third calculation unit determines the correction amount such that the greater the ratio of pixels whose signal levels are equal to or greater than the second threshold is, the smaller the correction amount is, and, the smaller the ratio of pixels whose signal levels are equal to or greater than the second threshold is, the greater the correction amount is.

In order to solve the aforementioned problems, the present invention provides an image processing method comprising: an object detection step of detecting a person in an input image; a first calculation step of calculating information regarding a pixel whose pixel level is equal to or greater than a first threshold in the input image, and calculating a ratio of pixels whose signal levels are equal to or greater than a second threshold in pixel data of the person detected by the object detection unit; a second calculation step of calculating a control amount for performing tone control based on information regarding the pixel whose pixel level is equal to or greater than the first threshold that is calculated in the first calculation step; a third calculation step of calculating a correction amount for correcting the control amount in accordance with the ratio of pixels whose signal levels are equal to or greater than the second threshold that is calculated in the first calculation step; and a control step of determining an input-output characteristic of an image, based on the control amount calculated in the second calculation step and the correction amount calculated in the third calculation step, wherein in the third calculation step, the correction amount is determined such that the greater the ratio of pixels whose signal levels are equal to or greater Than the second threshold is, the smaller the correction amount is, and the smaller the ratio of pixels whose signal levels are equal to or greater than the second threshold is, the greater the correction amount is.

According to the present invention, it is possible to improve the overall image quality of an entire image capturing screen by controlling the tone in a high-luminance portion.

Further features of the present invention will become apparent from the following description of exemplary embodiments (with reference to the attached drawings).

BRIEF DESCRIPTION OF THE DRAWINGS

FIGS. 2A to 2C are diagrams illustrating a method for extracting highlight-detail loss frames in the present embodiment.

FIG. 6 is a flowchart showing the tone control according to the present embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

An embodiment will be described below in which an image processing apparatus of the present invention is applied to an image capturing apparatus typified by a digital still camera, a digital video camera, or the like, for example.

Apparatus Configuration

An overview of the configuration and functions of an image capturing apparatus according to an embodiment of the present invention will now be described with reference to FIG. 1.

Figure 1:
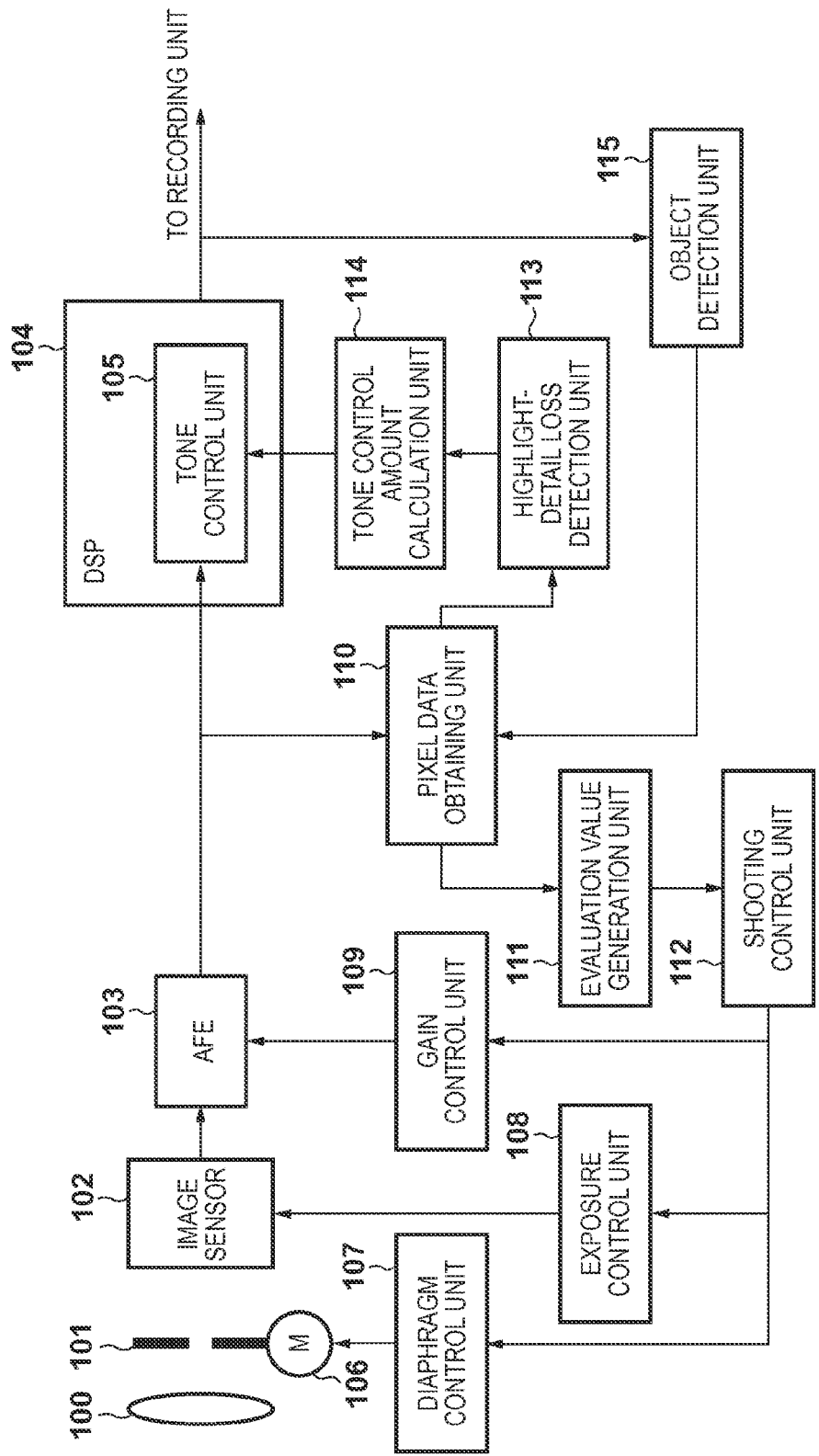
FIG. 1 is a block diagram showing an apparatus configuration in an embodiment according to the present embodiment.

In FIG. 1, a shooting lens 100 collects an optical image of an object, and forms an image on an imaging surface of an image sensor 102. A diaphragm 101 adjusts the amount of incident light of the optical image of the object. The image sensor 102 is an image sensor such as a CCD or a CMOS, and performs photoelectric conversion on an object image formed by the shooting lens 100. An AFE (analog front-end) 103 corrects an aberration of the shooting lens 100, corrects a defective pixel signal from the image sensor 102, and electrically amplifies video signal.

A diaphragm control unit 107 controls the diaphragm 101. An exposure control unit 108 controls the period of time (charge-accumulation time or exposure time) during which light is accumulated in the image sensor 102. A gain control unit 109 controls a block for electrically amplifying video signal of the AFE 103. A pixel data obtaining unit 110 obtains pixel data of the video signal that is output from the AFE 103. An evaluation value generation unit 111 generates an evaluation value using the pixel data obtained by the pixel data obtaining unit 110. The evaluation value generation unit 111 divides an image capturing screen into a plurality of areas as shown in FIG. 2A, performs weighting on the respective areas, and thereafter generates an evaluation value by means of a weighted average.

A shooting control unit 112 follows a predetermined program diagram to input the evaluation value generated by the evaluation value generation unit 111 and output a control instruction to the diaphragm control unit 107, the exposure control unit 108, and the gain control unit 109 in accordance with the result of comparison with a predetermined reference value. For example, the shooting control unit 112 determines that an evaluation value indicates overexposure if this evaluation value exceeds the predetermined reference value, and outputs a control value to the control units so as to set a correct exposure with which the evaluation value is smaller than or equal to the predetermined reference value. The program diagram refers to a control value indicating a combination of the diaphragm 101 and the shutter speed that is predetermined in association with the brightness of an object.

A highlight-detail loss detection unit 113 inputs the pixel data obtained by the pixel data obtaining unit 110 and calculates a ratio of a highlight-detail loss of the entire image capturing screen. For example, the highlight-detail loss detection unit 113 calculates the degree of the ratio of pixels whose pixel levels are equal to or greater than a predetermined first threshold in an input image, and calculates an average value of the pixels whose pixel level is equal to or greater than the predetermined first threshold.

A tone control amount calculation unit 114 calculates a tone control amount in accordance with the highlight-detail loss ratio and the average value detected by the highlight-detail loss detection unit 113. A tone control unit 105, which is included in a digital signal processing unit (DSP) 104, controls the tone of the input image in accordance with the control amount calculated by the tone control amount calculation unit 114, and ultimately determines the input-output conversion characteristic of the image. The image signal that is output from the tone control unit 105 is recorded in a recording unit. An object detection unit 115 detects object characteristic information, such as the position and the size of the face of a person in the input image.

Tone Control

Next, the tone control carried out by the tone control unit 105 in the present embodiment will be described with reference to FIG. 2.

The pixel data obtaining unit 110 inputs image signal of an entire image capturing screen, divides the image capturing screen into a plurality of areas for generating the evaluation value and for detecting a highlight-detail loss, as shown in FIG. 2A, and obtains the pixel data in the respective divided areas. The pixel data of the divided areas is input to the highlight-detail loss detection unit 113. The first threshold Yth indicating the pixel level at which a highlight-detail loss is determined to have occurred is set in the highlight-detail loss detection unit 113, which calculates the ratio of pixels whose pixel levels are equal to or greater than the first threshold Yth in the respective divided areas, as shown in FIG. 2B. The numeric values in FIG. 2B are percentages. Then, the highlight-detail loss detection unit 113 extracts the divided area in which the calculated ratio of the pixels having pixel levels equal to or greater than the first threshold is greater than or equal to a predetermined reference value Dth. The thus-extracted divided area in which the calculated ratio is greater than or equal to the predetermined reference value will be referred to as a highlight-detail loss frame. In the present embodiment, if the predetermined reference value Dth for extracting a divided area as the highlight-detail loss frame is set to 70%, the highlight-detail loss frames to be extracted are bold frames 200 to 204, as shown in FIG. 2C.

Next, a description will be given for a method of controlling the tone in a high-luminance portion using data of the above-described highlight-detail loss frames.

Figure 3A:
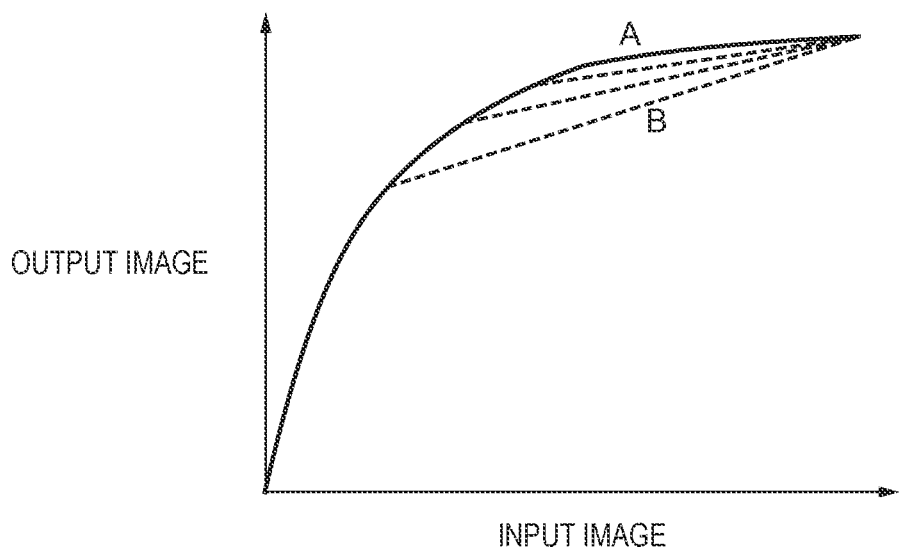
FIGS. 3A and 3B are diagrams showing input-output conversion characteristics of an image and a relationship between a highlight-detail loss frame average value and a tone modification amount, respectively, in tone control in the present embodiment.

First, the highlight-detail loss calculation unit 113 calculates an average value Dave of the ratio of the pixels whose pixel levels are equal to or greater than the first threshold Yth in the highlight-detail loss frames 200 to 204. In the present embodiment, the average value Dave is 80%. Since the predetermined reference value Dth is set to 70, the range of the average values to be calculated is from the minimum value Dmin, which is 70%, to the maximum value Dmax, which is 100%. FIG. 3A shows the input-output conversion characteristics of an image in the tone control for a high-luminance portion carried out by the tone control unit 105, and a plurality of input-output conversion characteristics of the high-luminance portion are prepared. The curve of a solid line A in FIG. 3A indicates an input-output characteristic that is set as an initial value in the tone control unit 105, and the curves of broken lines indicate input-output characteristics that can be set in addition to the initial value A, in accordance with the result of calculation by the tone control amount calculation unit 114. In particular, the curve of a broken line B indicates an input-output characteristic according to which input of high-luminance portions is output such that the output is smaller than that of the curve A so as to darken pixels that appear to have lost their highlight-details to the greatest extent possible and emphasize the tone of these pixels.

Figure 3B:
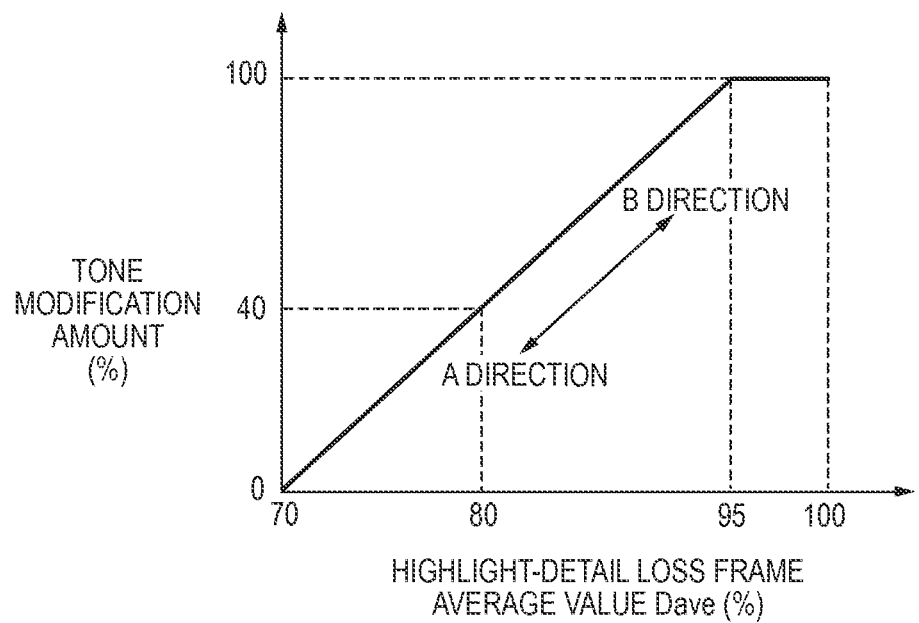

The tone control amount calculation unit 114 determines which of the input-output characteristics shown in FIG. 3A to select, using the highlight-detail loss frame average value Dave calculated by the highlight-detail loss detection unit 113. FIG. 3B shows the method for this determination, in which the horizontal axis indicates the highlight-detail loss average value Dave (%), and the vertical axis indicates a tone modification amount (%). The tone modification amount 0% corresponds to the curve A in FIG. 3A, which is the initial value, and the tone modification amount 100% corresponds to the curve B. When the highlight-detail loss frame average value Dave is 70% or smarter, that is to say, when no highlight-detail loss frame is extracted, or when a highlight-detail loss frame is extracted but the highlight-detail loss ratio is small, the tone modification amount is 0% and corresponds to the curve A that is the initial value. As the highlight-detail loss frame average value Dave increases, that is to say, as the highlight-detail loss ratio increases, the tone modification amount increases and ultimately corresponds to the curve B, and the frames are expressed more darkly with their tone being emphasized (i.e., with the slope of their input/output being steep). With this tone control, a high-luminance object is darkened such that the degree of the highlight-detail loss can be reduced, and the difference between bright and dark parts is increased. Although the entire image capturing screen is divided into a plurality of areas for calculation in the present embodiment, any area may be divided into a plurality of areas for calculation.

Figure 4:
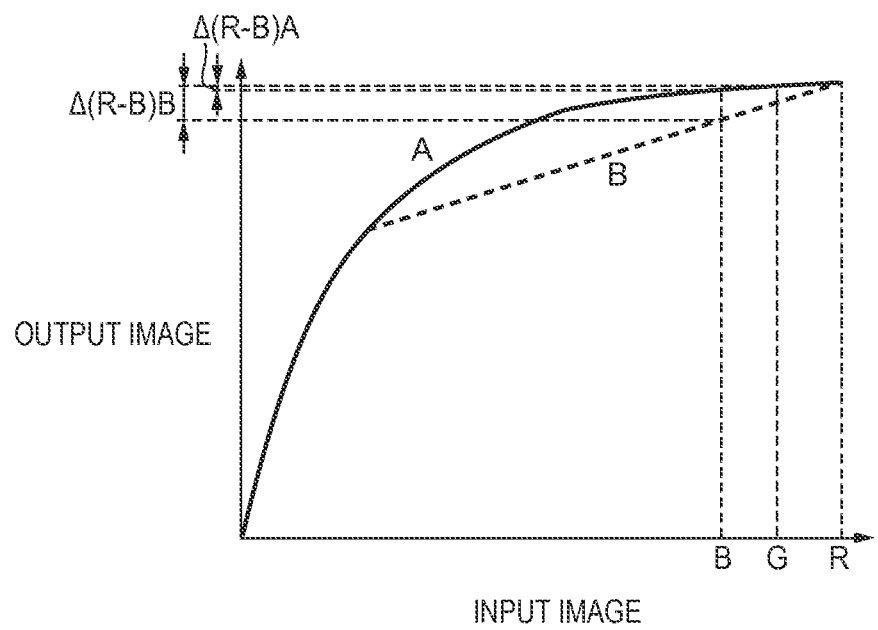
FIG. 4 is a diagram illustrating a cause of color curving due to the tone control in the present embodiment.

Now, a description will be given, with reference to FIG. 4, for the manifestation of color curving, which is a harmful effect caused when the above-described tone control is performed.

When the above-described tone control is performed, if a person exists in an image capturing screen and a bright portion that appears to have lost highlight-details exists in the person's skin, a color other than the skin color is provided in the portion that appears to have lost highlight-details. For example, FIG. 4 shows a difference in the output image due to a difference in the input-output characteristic when a certain pixel is extracted from the portion of the person's skin. As shown in FIG. 4, if only R pixels are saturated, the output difference $\Delta(R-B)$ between R and B on the curve B is greater than the output difference $\Delta(R-B)A$ on the curve A, resulting in greater color curving. This color curving can be reduced by performing the control described below, which serves as a countermeasure against the color curving.

Figure 5A:
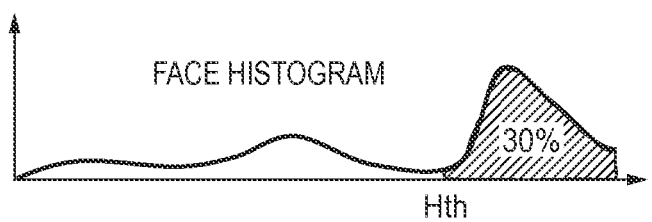
FIGS. 5A and 5B are diagrams respectively showing a face histogram obtained by face detection processing in the present embodiment and a relationship between a face highlight-detail loss ratio and a tone correction amount.

A person's face is detected by the object detection unit 115 in FIG. 1, and feature information regarding the person's face, such as the calculated position and size thereof in the image capturing screen, is output to the pixel data obtaining unit 110. The pixel data obtaining unit 110 obtains the pixel data of the person's face using the feature information. The pixel data obtained here indicates a histogram of the face, as shown in FIG. 5A. Note that if not a histogram, the face region may be divided into a plurality of areas, and pixel data may be obtained in the respective divided areas. The pixel data obtained by the pixel data obtaining unit 110 is output to the highlight-detail loss detection unit 113, and the highlight-detail loss detection unit 113 counts the number of pixels whose signal levels are equal to or greater than a predetermined second threshold Hth, from the obtained face histogram, and calculates a ratio Df of the counted pixel number to the pixel number of the entire face. Hereinafter, the calculated ratio of the pixels whose signal levels are equal to or greater than the second threshold will be referred to as a face highlight-detail loss ratio. In the present embodiment, it is assumed that the face highlight-detail loss ratio Df is 30%. The tone control amount calculation unit 114 inputs the face highlight-detail loss ratio calculated by the highlight-detail loss detection unit 113, calculates a tone correction amount for correcting the tone control amount, and outputs it to the tone control unit 105.

Figure 5B:
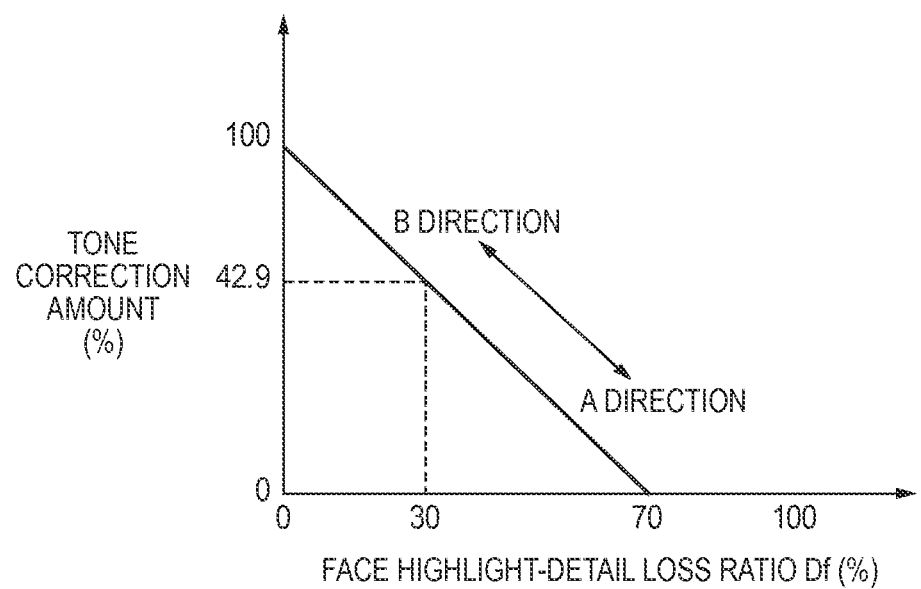

Next, a description will be given, with reference to FIG. 5B, for tone correction amount calculation processing performed by the tone control amount calculation unit 114. In FIG. 5B, the horizontal axis indicates the face highlight-detail loss ratio Df (%), and the vertical axis indicates the tone correction amount (%). The tone correction amount refers to a value for determining what percentage of the above-described tone control amount determined based on the entire image capturing screen is to be effective. That is to say, assuming that the tone control amount calculated based on the entire image capturing screen is 80% and the tone correction amount that was determined based on the face highlight-detail loss ratio is 80%, the total tone control amount is 80%×80%=64%. Accordingly, the greater the face highlight-detail loss ratio Df is, the smaller the tone correction amount is, and as a result, the smaller the tone control amount is. In other words, when a large amount of color curving is caused due to the face highlight-detail loss, the to is brought close to the curve A in FIG. 3A, and on the contrary, if little color curving due to the face highlight-detail loss is caused, the tone is brought close to the curve B in FIG. 3A.

In the present embodiment, the tone control amount that was determined using the highlight-detail loss frame average value Dave of the entire image capturing screen is 10% according to FIG. 3B, and the tone correction amount that was determined using the face highlight-detail loss ratio Df is 42.9% according to FIG. 5B. The ultimate tone control amount calculated by the tone control amount calculation unit 114 in FIG. 1 is 40%×42.9%=17.2%. The tone control unit 105 generates the tone in the high-luminance portion using that correction amount, based on a curve that is brought close to the B side from the A side by 17.2% when linear interpolation is performed between the curves A and B shown in FIG. 3A.

Thus, by controlling the tone in the high-luminance portion in accordance with the face highlight-detail loss, tone control is possible by which color curving of the memory colors that human eyes are highly sensitive to when changed is suppressed to the greatest extent possible, and an improvement of the overall image quality of an entire image capturing screen can be achieved.

Control Flow

Next, a description will be given, with reference to FIG. 6, for a tone control procedure in the present embodiment.

Note that the processing in FIG. 6 is realized by the respective constituent elements in FIG. 1 executing the processing in accordance with a predetermined control program.

In step S600, the highlight-detail loss detection unit 113 calculates the highlight-detail loss frame average value Dave, as described above with reference to FIG. 2.

In step S601, the tone control amount calculation unit 114 calculates the tone modification amount using the highlight-detail loss frame average value Dave calculated by the highlight-detail loss detection unit 113.

In step S602, the object detection unit 115 detects a person's face in an input image and determines whether or not a person's face exists in the image capturing screen, and processing proceeds to step S604 if the face exists, and proceeds to step S603 if not.

In step S603, since a person's face does not exist in the input image, the tone control unit 105 executes the tone control based on the tone modification amount calculated in step S601.

In step S604, since a person's face exists in the input image, the pixel data obtaining unit 110 obtains a histogram of the person's face detected by the object detection unit 115, and the highlight-detail loss detection unit 113 calculates the face highlight-detail loss ratio using the face histogram obtained by the pixel data obtaining unit 110.

In step S605, the tone control amount calculation unit 114 calculates the tone correction amount using the relationship shown in FIG. 5B, based on the face highlight-detail loss ratio calculated in step S604.

In step S606, the tone control amount calculation unit 114 recalculates the tone modification amount by multiplying the tone modification amount calculated in step S601 by the tone correction amount calculated in step S605.

In step 3603, the tone control unit 105 executes the tone control, based on the tone modification amount calculated in step S606.

As described thus far, by controlling the tone in the high-luminance portion in accordance with the highlight-detail loss in the face, tone control is possible by which color curving of the memory colors that human eyes are highly sensitive to when changed is suppressed to the greatest extent possible, and an improvement of the overall image quality of an entire image capturing screen can be achieved.

Furthermore, in the case where pixels are saturated and color curving is caused when a person is shot, it is possible to suppress the color curving to a minimum and express the tone in a natural manner by controlling the tone in a high-luminance portion.

Although the present embodiment was described taking, as an example, the case where the present invention is applied to an image capturing apparatus such as a digital video camera, this need not be the case, and the present invention is applicable to any apparatus that performs the tone control for input images.

In the above embodiment, the ultimate tone modification amount is calculated by correcting the tone modification amount that was calculated using the highlight-detail loss frame average value Dave, based on the tone correction amount calculated using the face highlight-detail loss ratio. However, the method for controlling the tone in a high-luminance portion based on the information (first information) regarding a highlight-detail loss in an area of a person's face and the information (second information) regarding a highlight-detail loss in an area greater than the face area is not limited to the above-described method. For example, it is possible to use, as the information regarding a highlight-detail loss, the number of pixels that are considered to have lost highlight-details, the number of blocks that can be considered to have lost highlight-details when a target area is divided into a plurality of blocks, and the size of an area that is considered to have lost highlight-details, rather than the ratio of the area that is considered to have lost highlight-details. Further, a configuration is also possible in which a table that associates the combination of the first information and the second information with de tone modification amount is stored in advance in the tone control amount calculation unit 114, and the tone modification amount that satisfies a condition is selected from the table. Alternatively, a configuration is also possible in which a large number of pieces of information regarding the input-output characteristics, such as the curve A shown in FIG. 3A, are stored in advance in the tone control amount calculation unit 114, and the most appropriate information regarding the input-output characteristic is selected based on the combination of the first information and the second information.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-277441, filed Dec. 19, 2012, which is hereby incorporated by reference herein in its entirety.

What is claimed is:

1. An image processing apparatus comprising:
an input unit configured to input an image;
an object detection unit configured to detect a person in an input image;
a first calculation unit configured to calculate information regarding a pixel whose pixel level is equal so or greater than a first threshold in the input image, and calculate a ratio of pixels whose signal levels are equal to or greater than a second threshold in pixel data of the person detected by the object detection unit;
a second calculation unit configured to calculate a control amount for performing tone control based on information regarding the pixel whose pixel level is equal to or greater than the first threshold that is calculated by the first calculation unit;
a third calculation unit configured to calculate a correction amount for correcting the control amount in accordance with the ratio of pixels whose signal levels are equal to or greater than the second threshold that is calculated by the first calculation unit; and a control unit configured to determine an input-output characteristic of an image, based on the control amount calculated by the second calculation unit and the correction amount calculated by the third calculation unit, wherein the third calculation unit determines the correction amount such that the greater the ratio of pixels whose signal levels are equal to or greater than the second threshold is, the smaller the correction amount is, and, the smaller the ratio of pixels whose signal levels are equal to or greater than the second threshold is, the greater the correction amount is.

2. The apparatus according to claim 1, wherein the object detection unit detects a face of a person in an input image, and the first calculation unit further includes a highlight-detail loss calculation unit configured to calculate, based on the input image, a highlight-detail loss ratio of an entire image capturing screen, and calculate a highlight-detail loss ratio of the entire face detected by the object detection unit.

3. The apparatus according to claim 2, further comprising a generation unit configured to generate a histogram of the face of the person detected by the object detection unit, based on pixel data of the face, wherein the first calculation unit calculates the ratio of pixels whose signal levels are equal to or greater than the second threshold, based on the histogram of the face.

4. The apparatus according to claim 2, wherein the second calculation unit determines the control amount such that a slope of the input-output characteristic of the image is steeper as the highlight-detail loss ratio of the entire image capturing screen is greater.

5. The apparatus according to claim 2, wherein the third calculation unit determines the correction amount such that a slope of the input-output characteristic of the image is less steep as the highlight-detail loss ratio of the entire face is greater.

6. The apparatus according to claim 1, further comprising a capturing unit configured to capture an image, wherein the input image is an image captured by the capturing unit.

7. An image processing method comprising:

an object detection step of detecting a person in an input image;

a first calculation step of calculating information regarding a pixel whose pixel level is equal so or greater than a first threshold in the input image, and calculating a ratio of pixels whose signal levels are equal to or greater than a second threshold in pixel data of the person detected by the object detection unit;

a second calculation step of calculating a control amount for performing tone control based on information regarding the pixel whose pixel level is equal to or greater than the first threshold that is calculated in the first calculation step;

a third calculation step of calculating a correction amount for correcting the control amount in accordance with the ratio of pixels whose signal levels are equal to or greater than the second threshold that is calculated in the first calculation step; and a control step of determining an input-output characteristic of an image, based on the control amount calculated in the second calculation step and the correction amount calculated in the third calculation step, wherein in the third calculation step, the correction amount is determined such that the greater the ratio of pixels whose signal levels are equal to or greater than the second threshold is, the smaller the correction amount is, and the smaller the ratio of pixels whose signal levels are equal to or greater than the second threshold is, the greater the correction amount is.

8. A non-transitory computer-readable storage medium storing a program for causing a computer to execute the image processing method according to claim 7.

* * * * *